(12) United States Patent
Ishida

(10) Patent No.: US 9,638,308 B2
(45) Date of Patent: May 2, 2017

(54) PULLEY STRUCTURE

(75) Inventor: Tomokazu Ishida, Hyogo (JP)

(73) Assignee: MITSUBOSHI BELTING LTD., Hyogo (JP)

( * ) Notice: Subject to any disclaimer, the term of this patent is extended or adjusted under 35 U.S.C. 154(b) by 248 days.

(21) Appl. No.: 13/817,967

(22) PCT Filed: Aug. 30, 2011

(86) PCT No.: PCT/JP2011/069669
§ 371 (c)(1),
(2), (4) Date: Feb. 20, 2013

(87) PCT Pub. No.: WO2012/029815
PCT Pub. Date: Mar. 8, 2012

(65) Prior Publication Data
US 2013/0150191 A1 Jun. 13, 2013

(30) Foreign Application Priority Data
Aug. 31, 2010 (JP) .................. 2010-193935

(51) Int. Cl.
*F16H 55/36* (2006.01)
*F16D 7/02* (2006.01)
*F16F 15/123* (2006.01)

(52) U.S. Cl.
CPC ............. *F16H 55/36* (2013.01); *F16D 7/028* (2013.01); *F16F 15/123* (2013.01); *F16H 2055/366* (2013.01)

(58) Field of Classification Search
CPC .... F16H 55/36; F16H 2055/366; F16H 55/02; F16H 55/06; F16H 55/14; F16H 7/1218;
(Continued)

(56) References Cited

U.S. PATENT DOCUMENTS

2008/0108442 A1* 5/2008 Jansen .................. F16D 3/52
464/54
2010/0147646 A1 6/2010 Lannutti et al.

FOREIGN PATENT DOCUMENTS

DE 10012233 A1 9/2001
EP 1754914 A1 2/2007
(Continued)

OTHER PUBLICATIONS

International Search Report (PCT/ISA/210 and PCT/ISA/220) dated Nov. 22, 2011 from the International Searching Authority in counterpart application No. PCT/JP/2011/069669.
(Continued)

*Primary Examiner* — William E Dondero
*Assistant Examiner* — Juan Campos, Jr.
(74) *Attorney, Agent, or Firm* — Sughrue Mion, PLLC

(57) ABSTRACT

A drive pulley structure has a cylindrical pulley member, a hub structure that is provided inside the pulley member so as to rotate relative to the pulley member, a coil spring that is fixed to the hub structure, a tapering which has a conical round surface as of a cone whose axis is made up of a rotational axis J of the hub structure, and a frictional member that is inserted to be interposed between the conical round surface of the tapering and the pulley member, and the coil spring is inserted to be interposed in place while being compressed in the direction of the rotational axis of the hub structure, the tapering, the frictional member and the pulley member being brought into press contact with each other by virtue of a restoring force P of the coil spring.

6 Claims, 7 Drawing Sheets

(58) Field of Classification Search
CPC ...... F16H 55/32; F16D 7/1209; F16D 7/1245;
F16D 3/72; F16D 3/12; F16D 47/02;
F16D 43/218; F16F 15/123
USPC .............. 474/94; 192/55.1, 41.5, 81 C, 56.6;
464/57, 60
See application file for complete search history.

(56) References Cited

FOREIGN PATENT DOCUMENTS

| | | | |
|---|---|---|---|
| JP | 2000227128 A | * | 8/2000 |
| JP | 3268007 B2 | | 1/2002 |
| JP | 2003322174 A | | 11/2003 |
| JP | 200638183 A | | 2/2006 |
| JP | 2007113634 A | | 5/2007 |
| JP | 2008180261 A | * | 8/2008 |

OTHER PUBLICATIONS

Written Opinion (PCT/ISA/237) dated Nov. 22, 2011 from the International Searching Authority in counterpart application No. PCT/JP/2011/069669.
Search Report issued by the European Patent Office dated Jan. 29, 2014 in counterpart European Patent Application No. 11821830.4.

* cited by examiner

PULLEY STRUCTURE

TECHNICAL FIELD

The present invention relates to a pulley structure having a pulley member and a hub structure that can rotate relative to the pulley member.

BACKGROUND ART

In general, as a transmission mechanism for transmitting the power of an engine of a motor vehicle, there is a belt transmission mechanism in which a belt is looped between pulleys. Additionally, as a pulley structure that is used in such a belt transmission mechanism, there is known a pulley structure having a configuration for damping a change in rotation when the change in rotation is generated in one of two rotational members (for example, Patent Document 1).

As a technique of this kind, Patent Document 1 discloses a pulley including an annular pulley member, a hub structure (to which a shaft of an alternating current generator is fixed so as not to rotate relative thereto), and a coil spring that is mounted between the annular pulley member and the hub structure. According to this configuration, when a change in rotation is generated in the hub structure, the coil spring between the hub structure and the annular pulley member is elastically deformed to thereby damp the change in rotation.

However, when the natural frequency of the pulley described in Patent Document 1 above is set to be equal to or smaller than a frequency that is considered from experience to be generated by an engine revolution speed when an engine is idling, there may be a situation in which the pulley resonates when the engine starts to rotate or stops rotating. As a result, the relative distortion displacement between the annular pulley member and the hub structure is increased abruptly, and an excessive force is applied to the coil spring, leading to a problem that a failure of the coil spring itself is called for.

To cope with this problem, there has been proposed a pulley structure which adopts a spring clutch construction. As raised in Patent Document 2, for example, in this pulley structure, an end portion of a coil spring is not fixed directly to a pulley member or a hub structure. The end portion of the coil spring is elastically deformed in a radial direction and is then attached to the pulley member or the hub structure by virtue of a restoring force of the coil spring. Then, when an input torque that exceeds a frictional torque that is generated between the end portion of the coil spring and the pulley member or the hub structure is applied to the pulley member or the hub structure, a slip is cause to occur between the end portion of the coil spring and the pulley member or the hub structure so as to suppress the application of an excessive force to the coil spring, whereby the breakage of the coil spring itself can be prevented.

RELATE ART DOCUMENT

Patent Document

Patent Document 1: Japanese Patent No. 3268007
Patent Document 2: JP-A-2003-322174

SUMMARY OF THE INVENTION

Problems that the Invention is to Solve

When a spring clutch construction like the one described above is adopted, since the coil spring is produced by using a plastic deformation technique, it is difficult to have uniform accuracy in dimension and profile, leading to a problem that a frictional torque generated between the end portion of the coil spring and the pulley member or the hub structure tends to vary easily. Additionally, the frictional torque generated between the end portion of the coil spring and the pulley member or the hub structure is determined by the material and performance of the coil spring and the pulley member or the hub structure. However, the selection of a material and a performance for a coil spring to be used is limited (the degree of freedom in design is lowered) from the viewpoint of ensuring the elastic force of the coil spring and ensuring the strength of the pulley member/the hub structure, resulting in a case where a frictional torque demanded by the user cannot be realized.

Then, the invention has been made with a view to solving the problems described above, and an object thereof is to provide a pulley structure that can suppress the application of an excessive force to a coil spring to thereby prevent the breakage of the coil spring itself and which can increase the degree of freedom in design by changing freely the frictional torque while restricting the frictional torque to vary.

Means for Solving the Problems

According to a first aspect of the invention, there is provided a pulley structure including a cylindrical pulley member around which a belt is laid to extend, a hub structure that is provided inside the pulley member so as to rotate relative to the pulley member, a coil spring that is fixed to the hub structure or the pulley member at one end thereof, a tapering to which the other end of the coil spring is fixed and which has a conical round surface as of a cone whose axis is made up of a rotational axis of the hub structure, and a frictional member that is inserted to be interposed between the conical round surface of the tapering and the pulley member or between the conical round surface of the tapering and the hub structure, wherein the coil spring is inserted to be interposed in place while being compressed in the direction of the rotational axis of the hub structure, and the tapering, the frictional member and the pulley member are brought into press contact with each other, or the tapering, the frictional member and the hub structure are brought into press contact with each other by virtue of a restoring force of the coil spring.

According to the configuration described above, the tapering is pressed for contact by virtue of the restoring force of the coil spring, and the conical round surface of the tapering that is so pressed for contact is then brought into press contact with the pulley member or the hub structure via the frictional member. By adopting this configuration, a frictional torque is generated between the conical round surface of the tapering and the frictional member. Then, when an input torque that is larger than this frictional torque is inputted from the pulley member or the hub structure, a relative slip is made to be generated between the conical round surface of the tapering and the frictional member on a press contact surface therebetween so as to prevent the coil spring from being distorted to a certain level or larger. By preventing the coil spring from being distorted to the certain level or larger in the way described above, the durability of the coil spring can be increased. Additionally, the frictional member and the tapering having the conical round surface can be produced with good accuracy by cutting or molding using a mold, and therefore, the frictional torque can be restricted from varying. In addition, by changing freely the material/performance of the frictional member, a desired frictional torque can be set, thereby making it possible to increase the degree of freedom in design.

Additionally, according to a second aspect of the invention, there is provided a pulley structure as set forth in the first aspect of the invention, wherein the frictional member is fixed to the pulley member or the hub structure, so that the frictional member is allowed to slip relative to the tapering only.

According to the configuration described above, by fixing the frictional member to the pulley member or the hub structure, the frictional member is allowed to slip relative to the tapering only. By adopting this configuration, a value for the frictional torque that is generated between the conical round surface of the tapering and the frictional member can be determined only by taking into consideration a static friction coefficient value between the frictional member and the tapering.

In addition, according to a third aspect of the invention, there is provided a pulley structure as set forth in the first or second aspect of the invention, wherein as a fixing form of the coil spring, a form is adopted in which at least one of one end and the other end of the coil spring is locked on at least one of the hub structure, the pulley member and the tapering by virtue of the restoring force of the coil spring while being elastically deformed in a radial direction, and a slip is generated when a rotational torque is inputted which is larger than a frictional torque that is generated between at least one of the one end and the other end of the coil spring and at least one of the hub structure, the pulley member and the tapering.

According to the configuration described above, it is possible to generate the frictional torque that is generated between the conical round surface of the tapering and the frictional member and the frictional torque that is generated between at least one of the one end and the other end of the coil spring and at least one of the hub structure, the pulley member and the tapering. By adopting this configuration, the value of the frictional torque that is generated between the coil spring and at least one of the hub structure, the pulley member and the tapering and the value of the frictional torque that is generated between the conical round surface of the tapering and the frictional member can be changed freely so as to increase the degree of freedom in design.

Additionally, according to a fourth aspect of the invention, there is provided a pulley structure as set forth in the third aspect of the invention, wherein the frictional torque that is generated between the conical round surface of the tapering and the frictional member and the frictional torque that is generated between the coil spring and at least one of the hub structure, the pulley member and the tapering have different values.

According to the configuration described above, by causing the frictional torque that is generated between the conical round surface of the tapering and the frictional member and the frictional torque that is generated between the coil spring and at least one of the hub structure, the pulley member and the tapering to have the different values, it is possible to determine based on the magnitude of a rotational torque that is inputted from the pulley member or the hub structure where to cause a slip to occur, that is, either between the conical round surface of the tapering and the frictional member or between the coil spring and at least one of the hub structure, the pulley member and the tapering.

Advantageous Effects of the Invention

It is possible to provide the pulley structure that can suppress the application of an excessive force to the coil spring to thereby prevent the breakage of the coil spring itself and which can increase the degree of freedom in design by changing freely the frictional torque while restricting the frictional torque to vary.

MODES FOR CARRYING OUT THE INVENTION (First Embodiment)

Figure 1:
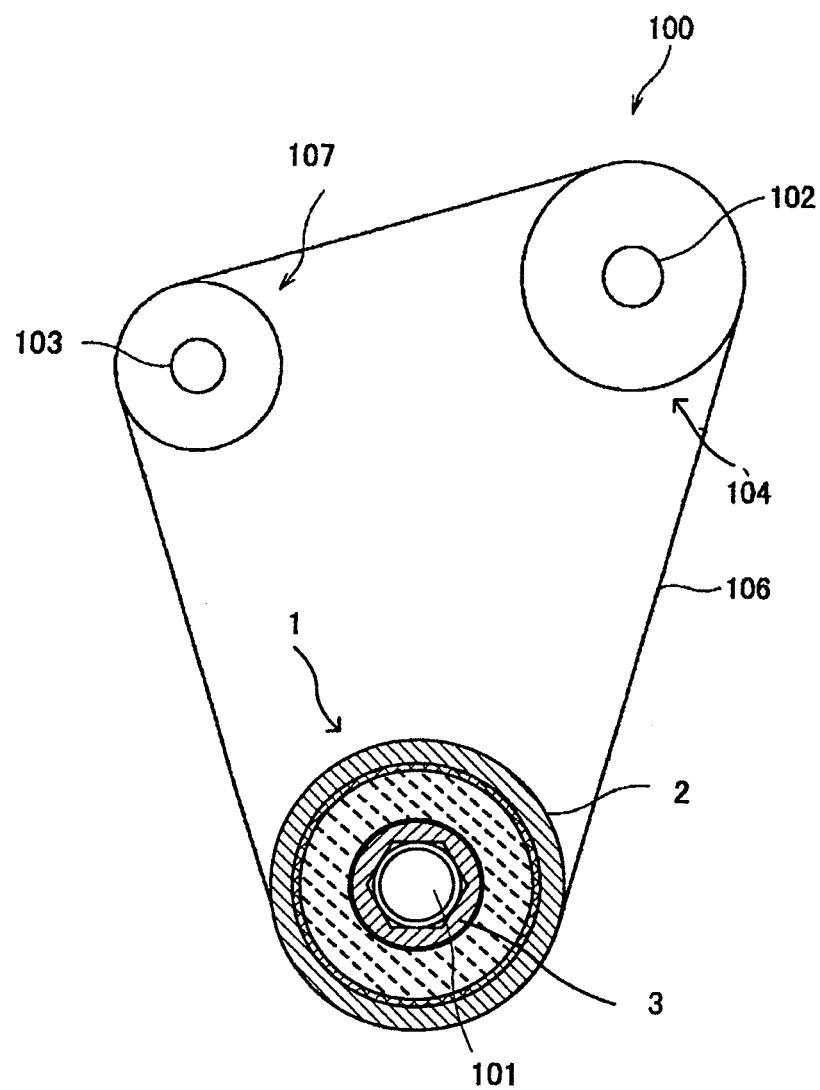
FIG. 1 is a schematic block diagram of an auxiliary driving belt system of a first embodiment.

A first embodiment of the invention will be described. As shown in FIG. 1, this embodiment describes an example where the invention is applied to a drive pulley structure 1 that is used in an auxiliary driving belt system 100 that drives an auxiliary (a water pump or an alternator) by torque of an output shaft 101 of a motor vehicle engine. Note that the drive pulley structure 1 is used to suppress a variation in tension of a transmission belt 106 that is attributed to a change in rotation of the engine.

(Auxiliary Driving Belt System 100)

FIG. 1 is a schematic block diagram of the auxiliary driving belt system 100 of this embodiment. As is shown in FIG. 1, the auxiliary driving belt system 100 has the drive pulley structure 1 (a pulley structure) that is connected to the output shaft 101 of the engine (a crankshaft of a reciprocating engine or an eccentric shaft of a rotary engine), driven shafts (auxiliary shafts) 102, 103 that are connected to auxiliaries such as a water pump and an alternator, a driven pulley structure 104 that is mounted on the driven shaft 102, a driven pulley structure 107 that is mounted on the driven shaft 103 and the transmission belt 106 that is looped over the drive pulley structure 1, the driven pulley structure 104, and the driven pulley structure 107. In this embodiment, a V ribbed belt having a plurality of V-shaped ribs that extend parallel to each other along a longitudinal direction of the belt is used as the transmission belt 106.

In the auxiliary driving belt system 100, when the drive pulley structure 1 is driven to rotate by the torque of the output shaft 101, the transmission belt 106 is driven by virtue of the rotation of the drive pulley structure 1. Then, the driven pulley structure 104 and the driven pulley structure 107 are driven to rotate as the transmission belt 106 runs in loop, whereby although not shown, the auxiliaries such as the water pump and the alternator that are connected to the driven shafts 102, 103 are driven.

(Configuration of Drive Pulley Structure 1)

Figure 2:
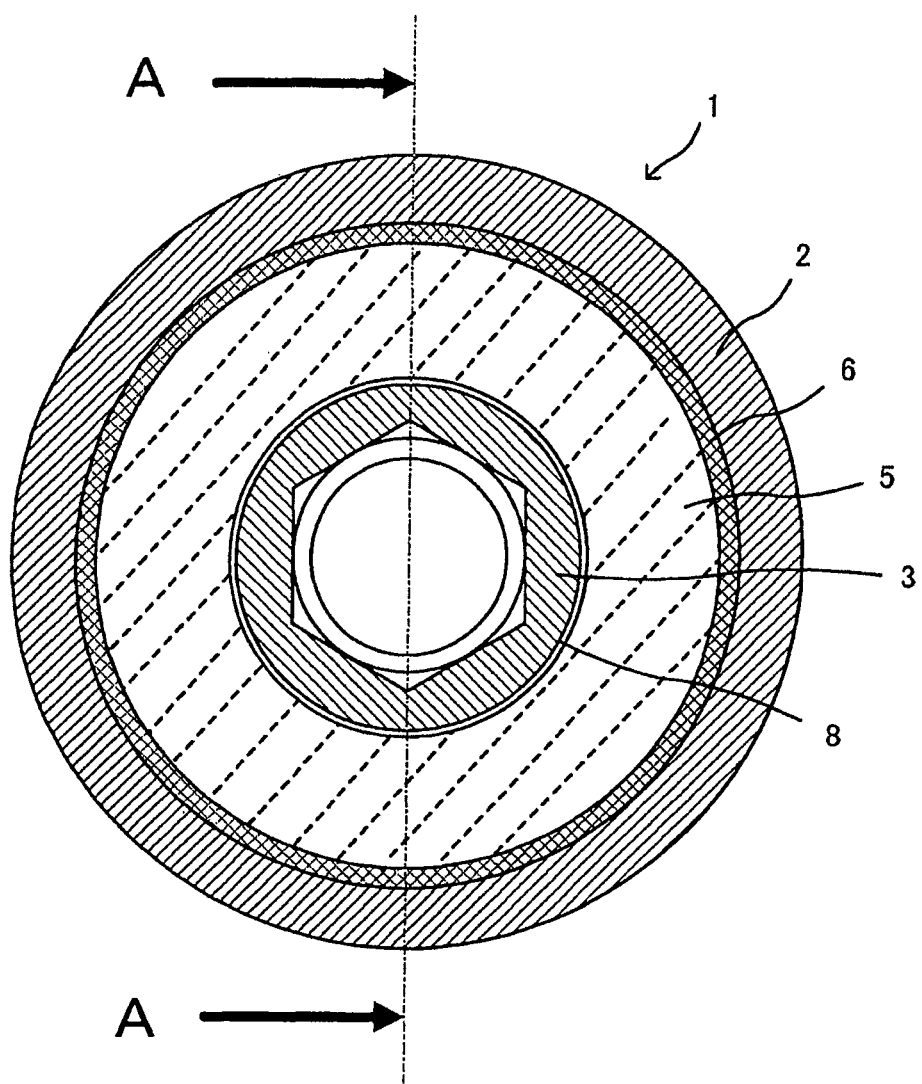
FIG. 2 is a plan view of a drive pulley structure according to the first embodiment.
Figure 3:
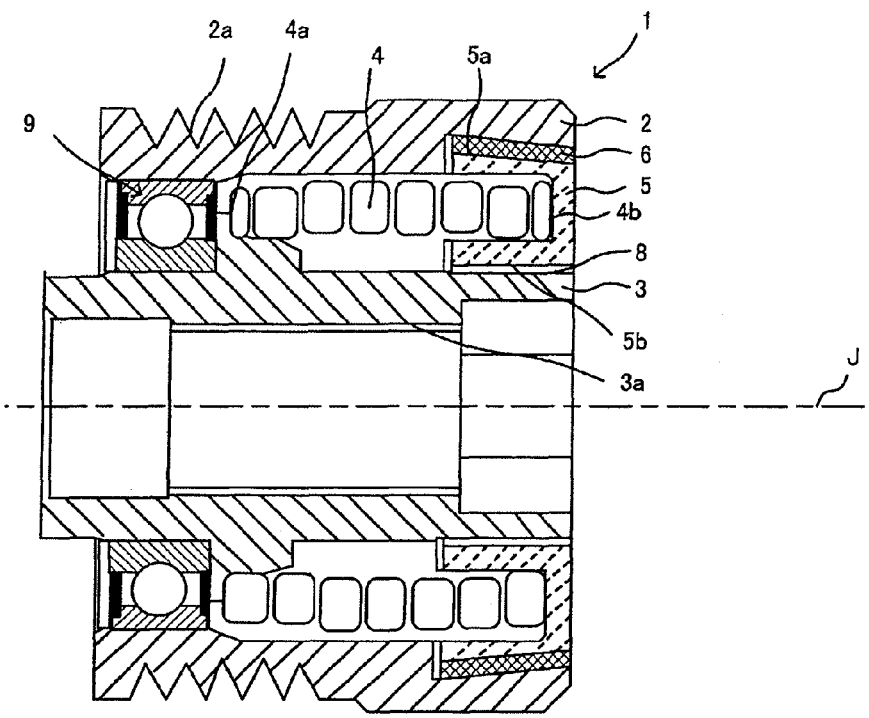
FIG. 3 is a sectional view taken along the line A-A that contains a rotational axis of the drive pulley structure shown in FIG. 2.
Figure 4:
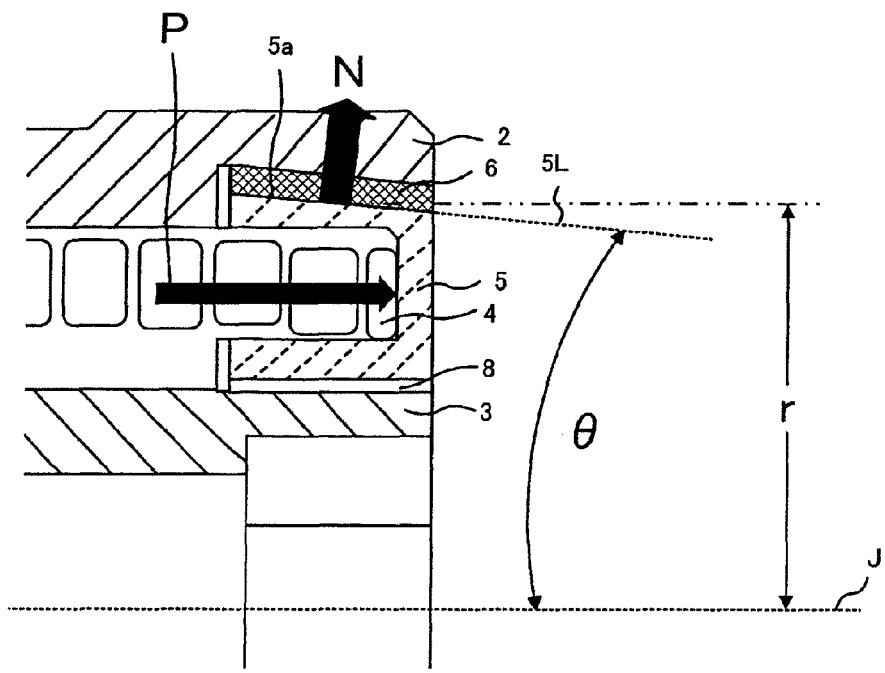
FIG. 4 is a diagram showing in detail the drive pulley structure shown in FIG. 3.

Next, the drive pulley structure 1 that is driven to rotate by virtue of the torque of the output shaft 101 will be described in detail. FIG. 2 is a plan view of the drive pulley structure 1. Additionally, FIG. 3 is a sectional view taken along the line A-A which contains a rotation axis J of the drive pulley structure 1 shown in FIG. 2. In addition, FIG. 4 is a diagram showing in detail the drive pulley structure 1 shown in FIG. 3.

As shown in FIGS. 2 and 3, the drive pulley structure 1 has a cylindrical pulley member 2 around which the transmission belt 106 is laid to extend, a hub structure 3 that is connected to the output shaft 101 and which is provided inside the pulley member 2, a coil spring 4 that is fixed to the hub structure 3 at one end 4a thereof, a tapering 5 to which the other end 4b of the coil spring 4 is fixed and which has an outer circumferential surface 5a having a conical round surface as of part of a cone whose axis is made up of the rotational axis J of the hub structure 3, and a frictional member 6 that is inserted to be interposed between the outer circumferential surface 5a of the tapering 5 that has the conical round surface as of the cone and the pulley member 2. Additionally, the pulley member 2 and the hub structure 3 are connected so as to rotate relative to each other via a rolling bearing 9. Further, a slide bearing 8 is provided so as to be interposed between the hub structure 3 and the tapering 5.

The pulley member 2 has a cylindrical shape, and a plurality of pulley grooves 2a are formed in an outer circumference of the pulley member 2 so as to extend in a circumferential direction thereof. Then, the transmission belt 106 is laid to extend around the outer circumference of the pulley member 2 in such a state that the plurality of V-shaped ribs that are provided on an inner circumference of the transmission belt 106 are in engagement with the corresponding pulley grooves 2a.

The hub structure 3 has also a cylindrical shape. The output shaft 101 is fitted in a cylindrical interior portion 3a of the hub structure 3 so as to extend therethrough. The output shaft 101 and the hub structure 3 are connected together by appropriate connecting devices such as bolts so as not to rotate relative to each other. Additionally, as materials of which the pulley member 2 and the hub structure 3 are made, a non-magnetic material (a paramagnetic material, a diamagnetic material or an anti-ferromagnetic material) is raised for each of them. Specifically, as a non-magnetic material, for example, an aluminum alloy, a titanium alloy or a synthetic resin is raised. Note that the pulley member 2 and the hub structure 3 are connected together so as to rotate relative to each other via the rolling bearing 9.

As shown in FIG. 3, the tapering 5 has a substantially U-shaped in section. An inner circumferential surface of the tapering 5 has a cylindrical shape, and an outer circumferential surface 5a thereof has the conical round surface as of part of the cone whose axis is made up of the rotational axis J of the hub structure 3. Here, as shown in FIG. 4, when seen in section, an angle θ that is formed by an extension 5L of the outer circumferential surface 5a that is formed into the conical round surface and the rotational axis J is set to be in the range of 1° or larger to less than 90°. The slide bearing 8 is interposed between the hub structure 3 and the tapering 5, and the hub structure 3 and the tapering 5 are allowed to rotate relative to each other.

The frictional member 6 is inserted to be interposed between the outer circumferential surface 5a having the conical round surface and the pulley member 2, and the frictional member 6 itself is fixed to the pulley member 2 so as not to rotate. It is preferable that the frictional member 6 is made of a material which is superior in wear resistance and resistance to compression deformation. For example, metals such as brass, plated brass, bronze and plated bronze and synthetic resins such as polyamide, polyacetal and polyarylate are raised. Additionally, a static friction coefficient between the tapering 5 and the frictional member 6 is set to a value that enables a relative slip to be generated between the tapering 5 and the frictional member 6 when a desired input torque is received. Specifically, the static friction coefficient is set based on selected materials for the frictional member 6 and the tapering 5, a mode of a surface finish/configuration (for example, a configuration in which recesses and projections are arranged) of the frictional member 6 that is brought into abutment with the tapering 5 or the angle θ formed by the extension 5L of the outer circumferential surface 5a and the rotational axis J.

Used for the coil spring 4 is an angular coil spring in which an elongated linear member having a substantially rectangular cross section as shown in FIG. 3 is formed into a spiral shape. Additionally, the coil spring 4 is fixed to the hub structure 3 at the one end 4a thereof and is fixed to the tapering 5 at the other end 4b in such a state that the coil spring 4 is compressed in the direction of the rotational axis J. Then, the tapering 5 and the frictional member 6 are brought into press contact with each other by virtue of a restoring force P of the coil spring 4 so compressed.

Specifically, as shown in FIG. 4, the tapering 5 is pressed for contact by virtue of the restoring force P of the coil spring. Then, the outer circumferential surface 5a having the conical round surface of the tapering 5 that is so pressed for contact is brought into press contact with the frictional member 6 so as to press it by a vertical drag N that is expressed by the following expression (1) in relation to the angle θ that is formed by the extension 5L of the outer circumferential surface 5a and the rotational axis J when seen in section.

$$N = P \times \sin\theta \tag{1}$$

In addition, a frictional torque Tf that is generated between the outer circumferential surface 5a of the tapering 5 and the frictional member 6 when the outer circumferential surface 5a of the tapering 5 is brought into press contact with the frictional member 6 so as to press it by the vertical drag N expressed by the expression (1) above is expressed by the following expression (2).

$$Tf = \mu \times N \times r = \mu \times P \times \sin\theta \times r \tag{2}$$

where,
μ: Static friction coefficient between the tapering 5 and the frictional member 6
r: Average radius of the outer circumferential surface 5a having the conical round surface.

(Function of Drive Pulley Structure 1)

Next, the function of the drive pulley structure 1 of this embodiment will be described. Here, the function of the drive pulley structure 1 will be described based on an assumption that the output shaft 101 rotates when the engine is started to rotate, whereby torque is inputted into the drive pulley structure 1 from a hub structure 3 side thereof via the output shaft 101. Assuming that the torque that is inputted from the hub structure 3 side via the output shaft 101 is an input torque T (a variable), when the relation between T and Tf is something like a relation expressed by the following expression (3), there occurs no slip on an abutment surface between the outer circumferential surfaced 5a of the tapering 5 and the frictional member 6, and the coil spring 4 is distorted in a circumferential direction to thereby absorb the input torque T.

$$T<Tf \quad (3)$$

On the other hand, the relation between T and Tf is something like a relation expressed by the following expression (4), the coil spring 4 is not distorted in the circumferential direction, and a slip occurs on the abutment surface between the outer circumferential surface 5a of the tapering 5 and the frictional member 6, whereby the input torque T is absorbed by the slip.

$$T>Tf \quad (4)$$

According to the configuration described above, the tapering 5 is pressed for contact by the restoring force P of the coil spring 4, and the outer circumferential surface 5a having the conical round surface of the tapering 5 that is so pressed for contact is brought into press contact with the pulley member 2 via the frictional member 6 to press it. By doing so, the frictional torque Tf is generated between the outer circumferential surface 5a having the conical round surface of the tapering 5 and the frictional member 6. Then, when the input torque T that is larger than the frictional torque Tf is inputted from the hub structure 3, a relative slip is caused to occur on the surface where the outer circumferential surface 5a having the conical round surface of the tapering 5 and the frictional member 6 are pressed for contact with each other so that the coil spring 4 can be prevented from being distorted to a certain level or larger. By preventing the coil spring 4 from being distorted to the certain level or larger in this way, the durability of the coil spring 4 can be increased. Additionally, the frictional member 6 and the tapering 5 having the conical round surface that generate the frictional torque Tf can be produced with good accuracy by cutting or molding using a mold, and therefore, the frictional torque Tf can be restricted from varying. In addition, by changing freely the material/performance of the frictional member 6, a desired frictional torque Tf can be set, thereby making it possible to increase the degree of freedom in design.

Additionally, according to the configuration described above, by fixing the frictional member 6 to the pulley member 2 so as not to rotate, the frictional member 6 is allowed to slip relative to the tapering 5 only. By doing so, a value for the frictional torque Tf that is generated between the outer circumferential surface 5a having the conical round surface of the tapering 5 and the frictional member 6 can be determined only by taking into consideration a static friction coefficient value between the frictional member 6 and the tapering 5.

In this embodiment, while the pulley structure according to the invention is applied to the drive pulley structure 1 that is connected to the output shaft 101 of the engine, the pulley structure according to the invention may be applied to the driven pulley structures 104, 107 that are mounted on the driven shafts (the auxiliary shafts) 102, 103 that are connected to the auxiliaries such as the water pump and the alternator, respectively.

As this occurs, in the auxiliary driving belt system 100, when the drive pulley structure 1 is driven to rotate by the torque of the output shaft 101, the transmission belt 106 is driven by the rotation of the drive pulley structure 1. Then, as the transmission belt 106 runs in loop, torque is inputted from a pulley member 2 side of the driven pulley structure 104 or the driven pulley structure 107 to which the pulley structure according to the invention is applied. Assuming that the torque inputted is an input torque T (a variable), when the relation between T and Tf is something like the relation expressed by the expression (3), no slip occurs on the abutment surface between the outer circumferential surface 5a of the tapering 5 and the frictional member 6, but the coil spring 4 is distorted in the circumferential direction to thereby absorb the input torque T. On the other hand, when the relation between T and Tf is something like the relation expressed by the expression (4), the coil spring 4 is not distorted in the circumferential direction, but a slip occurs on the abutment surface between the outer circumferential surface 5a of the tapering 5 and the frictional member 6 to thereby absorb the input torque T.

(Second Embodiment)

Figure 5:
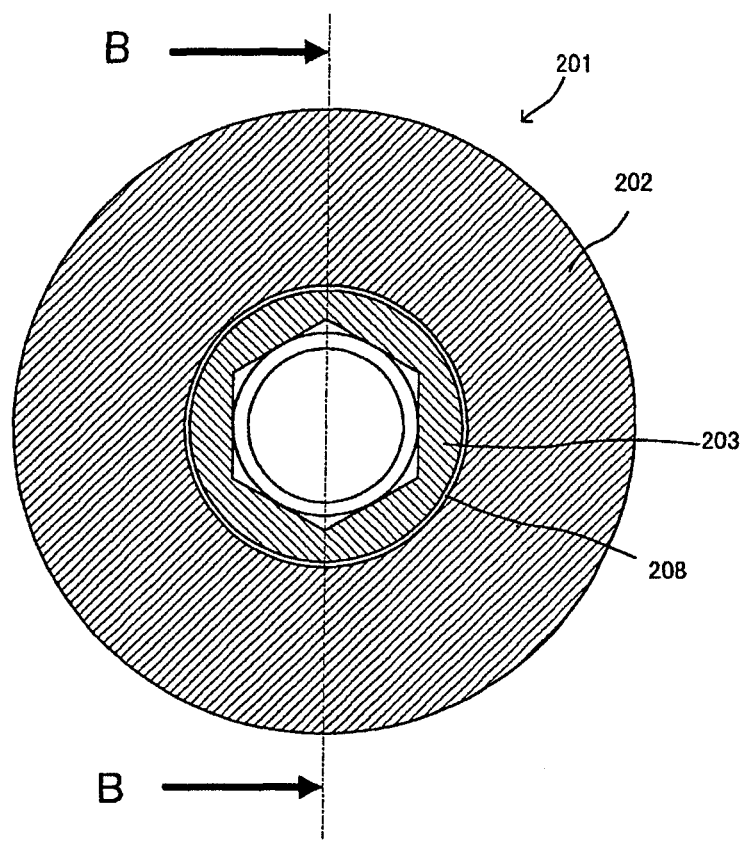
FIG. 5 is a plan view of a drive pulley structure according to a second embodiment.
Figure 6:
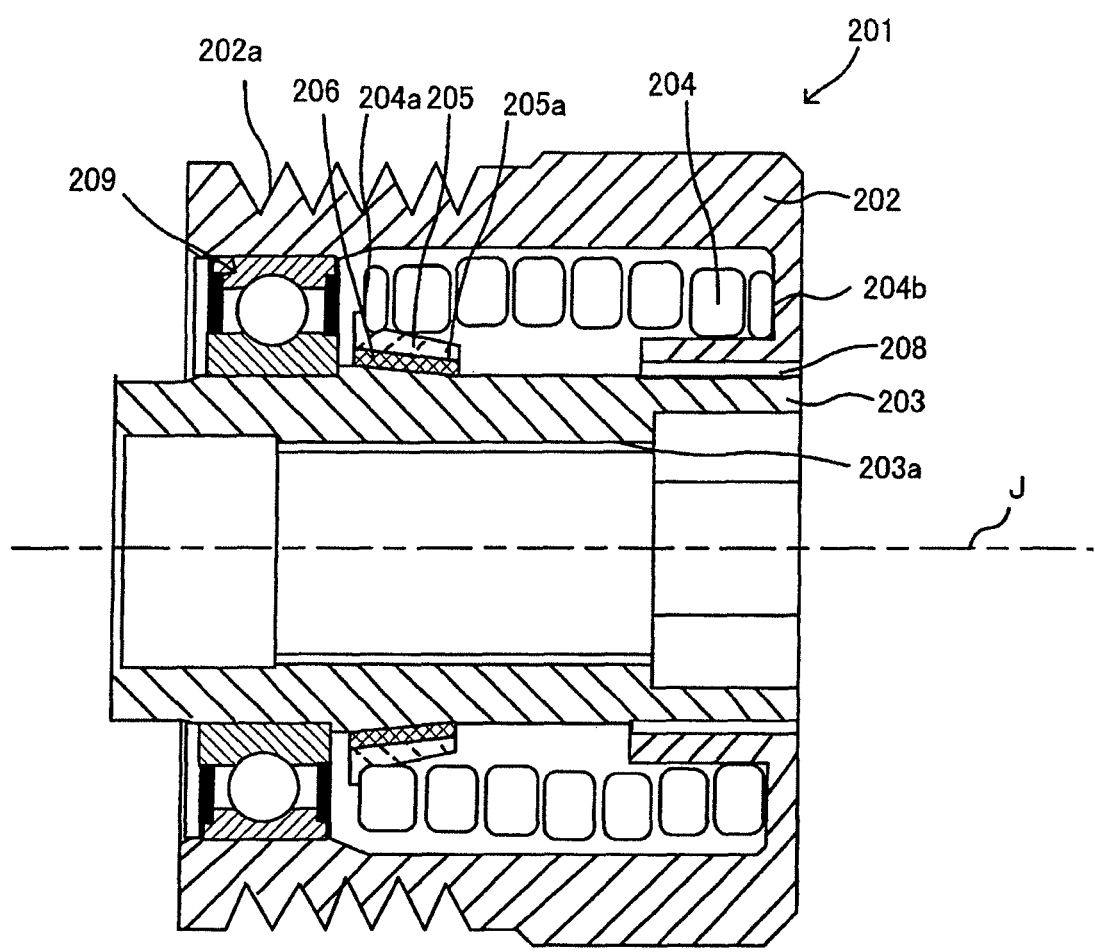
FIG. 6 is a sectional view taken along the line B-B that contains a rotational axis of the drive pulley structure shown in FIG. 5.
Figure 7:
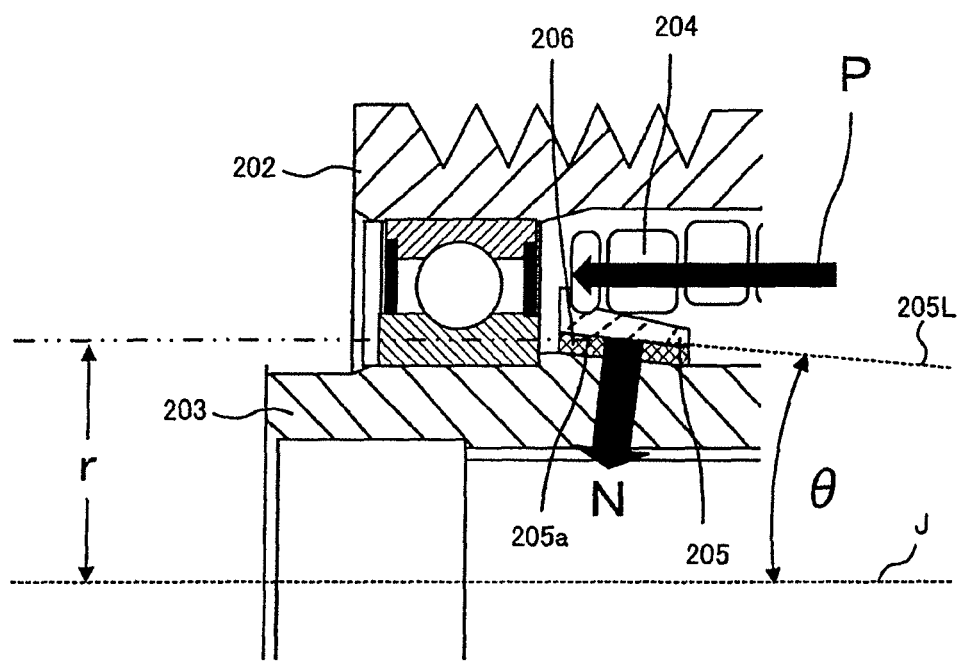
FIG. 7 is a diagram showing in detail the drive pulley structure shown in FIG. 6.

Next, a drive pulley structure 201 according to a second embodiment will be described mainly with respect to different configurations from the first embodiment by omitting the description of similar configurations to those of the first embodiment. FIG. 5 is a plan view of the pulley structure 201. Additionally, FIG. 6 is a sectional view taken along the line B-B that contains a rotational axis J of the drive pulley structure 201 shown in FIG. 5. In addition, FIG. 7 is a diagram showing in detail the drive pulley structure 201 shown in FIG. 6.

(Configuration of Drive Pulley Structure 201)

As shown in FIGS. 5 and 6, the drive pulley structure 201 has a cylindrical pulley member 202 around which a transmission belt 106 is laid to extend, a hub structure 203 that is connected to an output shaft 101 and which is provided inside the pulley member 202, a coil spring 204 that is fixed to the pulley member 202 at one end 204b thereof, a tapering 205 to which the other end 204a of the coil spring 204 is fixed and which has an inner circumferential surface 205a having a conical round surface as of part of a cone whose axis is made up of a rotational axis J of the hub structure 203, and a frictional member 206 that is inserted to be interposed between the inner circumferential surface 205a of the tapering 205 that has the conical round surface as of the cone and the hub structure 203. Additionally, the pulley member 202 and the hub structure 203 are connected so as to rotate relative to each other via a rolling bearing 209 and a slide bearing 208.

As shown in FIG. 6, the tapering 205 has a substantially cylindrical shape. The inner circumferential surface 205a of the tapering 205 has the conical round surface as of part of the cone whose axis is made up of the rotational axis J of the hub structure 203. Here, as shown in FIG. 7, when seen in section, an angle θ that is formed by an extension 205L of the inner circumferential surface 205a that has the conical round surface and the rotational axis J is set to be in the range of 1° or larger to less than 90°.

The frictional member 206 is inserted to be interposed between the inner circumferential surface 205a having the conical round surface and the hub structure 203, and the frictional member 206 itself is fixed to the hub structure 203 so as not to rotate.

The coil spring 204 is fixed to the pulley member 202 at the one end 204b thereof and is fixed to the tapering 205 at the other end 204a in such a state that the coil spring 204 is compressed in the direction of the rotational axis J. Then, the tapering 205 and the frictional member 206 are brought into press contact with each other by virtue of a restoring force P of the coil spring 204 so compressed.

Specifically, as shown in FIG. 7, the tapering 205 is pressed for contact by virtue of the restoring force P of the coil spring. Then, the inner circumferential surface 205a having the conical round surface of the tapering 205 that is so pressed for contact is brought into press contact with the frictional member 206 so as to press it by a vertical drag N that is expressed by the expression (1) described in the first embodiment in relation to the angle θ that is formed by the extension 205L of the inner circumferential surface 205a and the rotational axis J when seen in section.

In addition, a frictional torque Tf that is generated between the inner circumferential surface 205a of the tapering 205 and the frictional member 206 when the inner circumferential surface 205a of the tapering 205 is brought into press contact with the frictional member 206 so as to press it by the vertical drag N expressed by the expression (1) is expressed by the expression (2) that is described in the first embodiment. In the second embodiment, μ is a static friction coefficient between the tapering 205 and the frictional member 206, and r is an average radius of the inner circumferential surface 205a having the conical round surface.

(Function of Drive Pulley Structure 201)

Next, the function of the drive pulley structure 201 of this embodiment will be described. Here, the function of the drive pulley structure 1 will be described based on an assumption that the output shaft 101 rotates when the engine is started to rotate, whereby torque is inputted into the drive pulley structure 201 from a hub structure 203 side thereof via the output shaft 101. Assuming that the torque that is inputted from the hub structure 203 side via the output shaft 101 is an input torque T (a variable), when the relation between T and Tf is something like a relation (T<Tf) expressed by the expression (3) described above, there occurs no slip on an abutment surface between the inner circumferential surfaced 205a of the tapering 205 and the frictional member 206, but the coil spring 204 is distorted in a circumferential direction to thereby absorb the input torque T. On the other hand, the relation between T and Tf is something like a relation (T>Tf) expressed by the expression (4) described above, the coil spring 204 is not distorted in the circumferential direction, but a slip occurs on the abutment surface between the inner circumferential surface 205a of the tapering 205 and the frictional member 206, whereby the input torque T is absorbed by the slip.

According to the configuration described above, the tapering 205 is pressed for contact by the restoring force P of the coil spring 204, and the inner circumferential surface 205a having the conical round surface of the tapering 205 that is so pressed for contact is brought into press contact with the hub structure 203 via the frictional member 206 to press it. By doing so, the frictional torque Tf is generated between the inner circumferential surface 205a having the conical round surface of the tapering 205 and the frictional member 206. Then, when the input torque T that is larger than the frictional torque Tf is inputted from the hub structure 203, a relative slip is caused to occur on the surface where the inner circumferential surface 205a having the conical round surface of the tapering 205 and the frictional member 206 are pressed for contact with each other so that the coil spring 204 can be prevented from being distorted to a certain level or larger. By preventing the coil spring 204 from being distorted to the certain level or larger in this way, the durability of the coil spring 204 can be increased. Additionally, the frictional member 206 and the tapering 205 having the conical round surface that generate the frictional torque Tf can be produced with good accuracy by cutting or molding using a mold, and therefore, the frictional torque Tf can be restricted from varying. In addition, by changing freely the material/performance of the frictional member 206, a desired frictional torque Tf can be set, thereby making it possible to increase the degree of freedom in design.

Additionally, according to the configuration described above, by fixing the frictional member 206 to the hub structure 203 so as not to rotate, the frictional member 206 is allowed to slip relative to the tapering 205 only. By doing so, a value for the frictional torque Tf that is generated between the inner circumferential surface 205a having the conical round surface of the tapering 205 and the frictional member 206 can be determined only by taking into consideration a static friction coefficient value between the frictional member 206 and the tapering 205.

(Third Embodiment)

Figure 8:
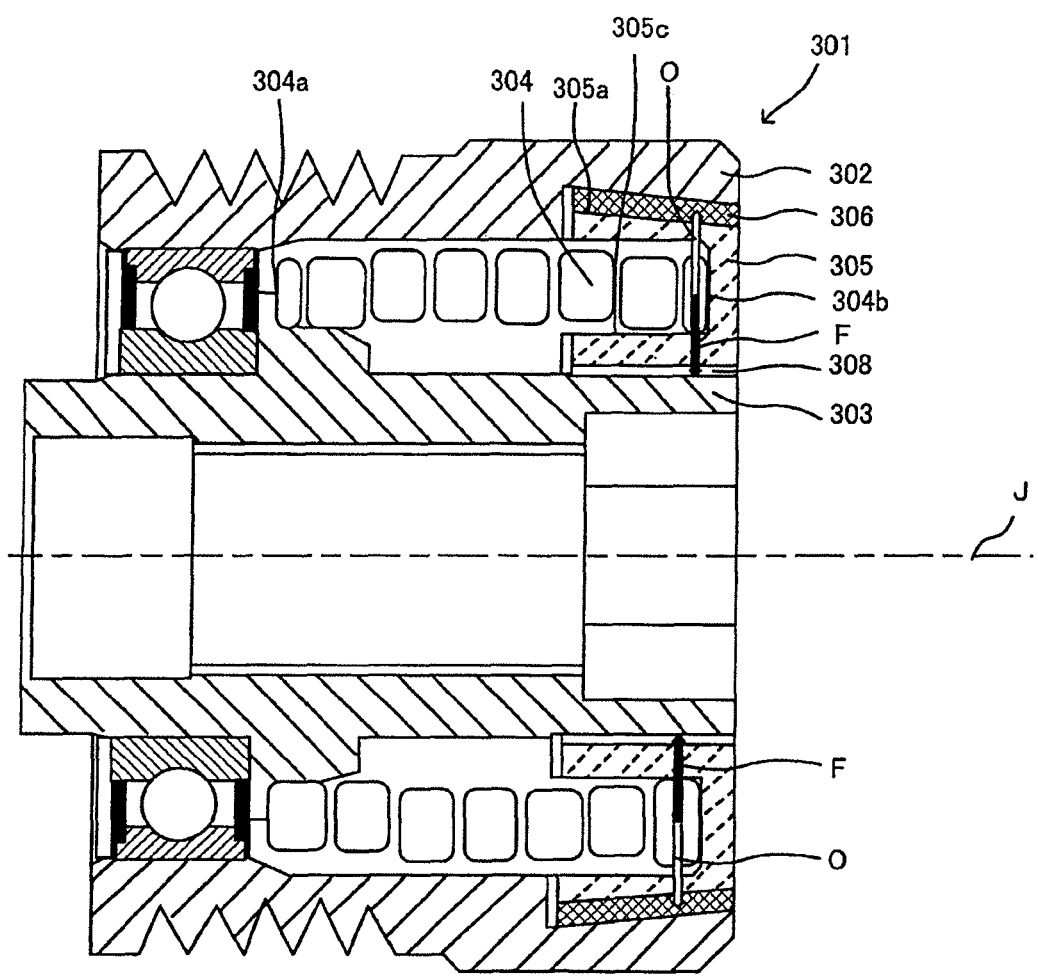
FIG. 8 is a sectional view that contains a rotational axis of a drive pulley structure according to a third embodiment.

Next, a driven pulley structure 301 (a pulley structure) according to a third embodiment will be described mainly with respect to different configurations from the first embodiment by omitting the description of similar configurations to those of the first embodiment. As shown in FIG. 8, the driven pulley structure 301 according to the third embodiment adopts a configuration in which a spring clutch construction is incorporated in a portion where the coil spring 4 of the drive pulley structure 1 is provided in the first embodiment. Additionally, the third embodiment will be described as the driven pulley structure 301 according to the invention being mounted on the driven shaft 102 of the auxiliary driving belt system 100 shown in FIG. 1 for use as a driven pulley structure. FIG. 8 is a sectional view that contains a rotational axis J of the driven pulley structure 301.

(Configuration of Driven Pulley Structure 301)

In the driven pulley structure 301 according to the third embodiment, the configuration adopted in the first embodiment is not adopted in which the coil spring 4 of the drive pulley structure 1 is fixed directly to the tapering 5 at the other end 4b thereof, but as shown in FIG. 8, a construction is adopted in which the other end 304b of a coil spring 304 is elastically deformed in a radially outward direction O, so that the coil spring 304 is locked to be mounted in a tapering 305 by virtue of a restoring force F (in a radially inward direction) thereof. On the other hand, one end 304a of the coil spring 304 is fixed to a hub structure 303.

(Function of Driven Pulley Structure 301)

Next, the function of the driven pulley structure 301 of this embodiment will be described. Firstly, the function of the driven pulley structure 301 will be described based on a case where an output shaft 101 rotates when the engine is started to rotate and torque is inputted into the driven pulley structure 301 from a pulley member 302 side of the driven pulley structure 301 via the drive pulley structure 1 and the transmission belt 106. This case is based on an assumption that a rotational torque of the pulley member 302 exceeds a rotational torque of the hub structure 303 of the driven pulley structure 301 when the engine is started to rotate.

As in the case with the first embodiment, assuming that the torque that is inputted into the driven pulley structure 301 from the pulley member 302 side is an input torque T (a variable) and that a frictional torque generated between an outer circumferential surface 305a of the tapering 305 and a frictional member 306 is Tf, when the relation between T and Tf is something like the relation (T<Tf) expressed by the expression (3), no slip is produced on an abutment surface between the outer circumferential surface 305a of the tapering 305 and the frictional member 306. Additionally, the coil spring 304 is contracted in diameter as a result of the contact with a clutch surface 305c of the tapering 305. Then, the coil spring 304 is distorted in a circumferential direction and is kept held to the clutch surface 305c with a press contact engaging force relative to the clutch surface 305c increased, no slip occurring, whereby the rotation of the pulley member 302 is transmitted to the hub structure 303. Then, an auxiliary such as a water pump or an alternator is driven which is connected to the driven shaft 102 that is mounted on the hub structure 303.

On the other hand, when the relation between T and Tf is something like the relation (T>Tf) expressed by the expression (4), the coil spring 304 is contracted in diameter as a result of the contact with the clutch surface 305c of the tapering 305 and is kept held to the clutch surface 305c with the press contact engaging force relative to the clutch surface 305c increased, no slip occurring. However, a slip occurs on the abutment surface between the outer circumferential surface 305a of the tapering 305 and the frictional member 306 to thereby absorb the input torque T. By absorbing the input torque T in this way, the rotation of the pulley member 302 is not transmitted to the hub structure 303, and the pulley member 302 rotates freely.

Next, the function of the driven pulley structure 301 will be described based on a case where although the rotational torque of the pulley member 302 is decreased via a transmission belt 106 when the output shaft 101 stops rotating as a result of the engine stopping rotating, the rotational torque of the hub structure 303 exceeds the rotational torque of the pulley member 302 due to the inertia produced when the engine rotates, that is, a case where torque is inputted into the driven pulley structure from a hub structure 303 side.

Assuming that the torque that is inputted into the driven pulley structure 301 from the hub structure 303 side is an input torque T (a variable), that a frictional torque generated between the outer circumferential surface 305a of the tapering 305 and the frictional member 306 is Tf and that a frictional torque generated between the coil spring 304 and the clutch surface 305c is Ts, when the relation between the frictional torques is such that T<Ts<Tf, no slip occurs on the abutment surface between the outer circumferential surface 305a of the tapering 305 and the frictional member 306. Additionally, the coil spring 304 is kept held to the clutch surface 305c and no slip occurs, whereby the rotation of the hub structure 303 is transmitted to the pulley member 302.

In addition, when the relation between the frictional torques is such that Ts<T<Tf, no slip occurs on the abutment surface between the outer circumferential surface 305a of the tapering 305 and the frictional member 306. On the other hand, the coil spring 304 is expanded in diameter, and the press contact engaging force relative to the clutch surface 305c is weakened, which causes a slip to occur at a contact portion between the coil spring 304 and the clutch surface 305c. Thus, the rotation of the hub structure 303 is not transmitted to the pulley member 302, whereby the hub structure 303 rotates freely.

Further, when the relation between the frictional torques is such that Ts<Tf<T, the coil spring 304 is expanded in diameter, and the press contact engaging force relative to the clutch surface 305c is weakened, which causes a slip to occur at the contact portion between the coil spring 304 and the clutch surface 305c. Thus, the rotation of the hub structure 303 is not transmitted to the pulley member 302, whereby the hub structure 303 rotates freely.

Here, in the third embodiment, the relation between the frictional torque Tf that is generated between the outer circumferential surface 305a of the tapering 305 and the frictional member 306 and the frictional torque Ts that is generated between the coil spring 304 and the clutch surface 305c is such that Ts<Tf. However, by setting freely the values of the frictional torques Ts, Tf (setting the values of Ts and Tf to different values), it is possible to determine based on the magnitude of the input torque T where to cause a slip to occur, that is, either between the outer circumferential surface 305a of the tapering 305 and the frictional member 306 or between the coil spring 304 and the clutch surface 305c.

For example, in describing a case where the rotational torque of the hub structure 303 exceeds the rotational torque of the pulley member 302 due to the inertia produced when the engine rotates, that is, a case where torque is inputted into the driven pulley structure 301 from the hub structure 303 side, with the relation between the frictional torques Tf, Ts being such that Tf<Ts, when the frictional torques are related to the input torque T so that Tf<T<Ts, the coil spring 304 is kept held to the clutch surface 305c with no slip caused to occur, while a slip is caused to occur on the abutment surface between the outer circumferential surface 305a of the tapering 305 and the frictional member 306, whereby the rotation of the hub structure 303 is not transmitted to the pulley member 302, and the hub structure 303 rotates freely.

In addition, when the frictional torques are related to the input torque T so that Tf<Ts<T, a slip is caused to occur on the abutment surface between the outer circumferential surface 305a of the tapering 305 and the frictional member 306, whereby the rotation of the hub structure 303 is not transmitted to the pulley member 302, and the hub structure 303 rotates freely.

Note that the driven pulley structure 301 functions in the same way also when the driven pulley structure 301 is mounted on the output shaft 101 for use as a drive pulley structure. In this case, the output shaft 101 rotates when the engine is started to rotate, and torque is inputted into the driven pulley structure 301 from the hub structure 303 side via the output shaft 101, whereby the rotational torque of the hub structure 303 exceeds the rotational torque of the pulley member 302. On the other hand, when the output shaft 101 stops rotating as a result of the engine stopping rotating, the rotational torque of the pulley member 302 exceeds the rotational torque of the hub structure 303 due to the transmission belt 106 being driven by the inertia, whereby torque is inputted into the driven pulley structure 301 from the pulley member 302 side.

Additionally, the third embodiment adopts the construction in which the other end 304b of the coil spring 304 is elastically deformed in the radially outward direction O so that the coil spring 304 is locked to be mounted in the tapering 305 by the restoring force F (in the radially inward direction) thereof. However, the invention is not limited thereto. A construction may be adopted in which the other end 304b of the coil spring 304 is elastically deformed in the radially inward direction so that the coil spring 304 is locked to be mounted in the tapering 305 by a restoring force (in the radially outward direction) thereof.

In addition, in the third embodiment, the one end 304a of the coil spring 304 is fixed to the hub structure 303. However, as with the other end 304b of the coil spring 304, the one end 304a of the coil spring 304 may be elastically deformed in the radially outward direction in place of being fixed to the hub structure 303 so that the one end 304a of the coil spring 304 is locked on the hub structure 303 by a restoring force (in the radially inward direction) thereof.

Additionally, in the driven pulley structure 301 according to the third embodiment, the configuration is adopted in which the spring clutch construction is incorporated at the portion where the coil spring 4 of the drive pulley structure 1 is provided in the first embodiment. However, a configuration may be adopted in which the spring clutch construction is incorporated at the portion where the coil spring 204 of the drive pulley structure 201 is provided in the second embodiment. As this occurs, the other end 204a of the coil spring 204 is elastically deformed in the radially outward direction so that the coil spring 204 is locked in the tapering 205 by a restoring force (in the radially inward direction) thereof. Additionally, the one end 204b of the coil spring 204 may be fixed to the pulley member 202 or may be elastically deformed in the radially outward (inward) direction, as with the other end 204a of the coil spring 204, so that the one end 204b of the coil spring 204 is locked on the pulley member 202 by a restoring force (in the radially inward (outward) direction) thereof.

According to the configuration described above, it is possible to generate the two frictional torques which are the frictional torque Tf that is generated between the outer circumferential surface 305a having the conical round surface of the tapering 305 and the frictional member 306 and the frictional torque Ts that is generated between the other end 304b of the coil spring 304 and the clutch surface 305c of the tapering 305. By generating the two frictional forces in the way described above, for example, when the driven pulley structure 301 according to the invention is mounted on the driven shaft 102 for use as the driven pulley structure, with the input torque T inputted from the pulley member 302 side, in the event that the input torque T is larger than the frictional torque Tf that is generated between the outer circumferential surface 305a of the tapering 305 and the frictional member 306, the input torque T can be absorbed by causing a slip to occur on the abutment surface between the outer circumferential surface 305a of the tapering 305 and the frictional member 306. On the other hand, with the input torque T inputted from the hub structure 303 side, in the event that the respective frictional torques are related to the input torque T so that Ts<T<Tf, no slip is caused to occur on the abutment surface between the outer circumferential surface 305a of the tapering 305 and the frictional member 306, but a slip is caused to occur in the coil spring 304 at the contact portion between the coil spring 304 and the clutch surface 305c. Thus, the rotation of the hub structure 303 is not transmitted to the pulley member 302, whereby the hub structure 303 is allowed to rotate freely. Further, in the event that the respective frictional torques are related to the input torque T so that Ts<Tf<T, a slip is caused to occur in the coil spring 304 at the contact portion between the coil spring 304 and the clutch surface 305c, and the rotation of the hub structure 303 is not transmitted to the pulley member 302, whereby the hub structure 303 is allowed to rotate freely. By adopting this configuration, it is possible to increase the degree of freedom in design by changing freely the values of the frictional torque Ts that is generated between the other end 304b of the coil spring 304 and the clutch surface 305c of the tapering 305 and the frictional torque Tf that is generated between the outer circumferential surface 305a having the conical round surface of the tapering 305 and the frictional member 306.

In addition, by setting freely the values of the frictional torques Ts, Tf (setting the values of Ts and Tf to different values), it is possible to determine based on the magnitude of the input torque T where to cause a slip to occur, that is, either between the outer circumferential surface 305a of the tapering 305 and the frictional member 306 or between the coil spring 304 and the clutch surface 305c.

Thus, while the embodiments of the invention have been described heretofore, the invention is not limited to the embodiments described above but can be carried out by being altered variously without departing from the scope of claims to be described later.

While the patent application has been described in detail and by reference to the specific embodiments, it is obvious to those skilled in the art to which the invention pertains that various alterations and modifications can be made thereto without departing from the spirit and scope of the invention.

This patent application is based on Japanese Patent Application (No. 2010-193935) filed on Aug. 31, 2010, the contents of which are incorporated herein by reference.

DESCRIPTION OF REFERENCE NUMERALS

1: 201: Drive pulley structure;
2, 202, 302: Pulley member
3, 203, 303: Hub structure
4, 204, 304: Coil spring
5, 205, 305: Tapering
6, 206, 306: Frictional member
100 Auxiliary driving belt system
101, 104, 107, 301: Driven pulley structure
106: Transmission belt; J Rotational axis

The invention claimed is:

1. A pulley structure comprising:
a cylindrical pulley member around which a belt is laid to extend;
a hub structure that is provided inside the pulley member so as to rotate relative to the pulley member;
a coil spring that is fixed to the hub structure at a first end thereof;
a tapering to which a second end of the coil spring is contacted and which has a conical round surface as of a cone whose axis is made up of a rotational axis of the hub structure;
a frictional member that is inserted to be interposed between the conical round surface of the tapering and the pulley member; and
a clutch surface on an inner circumferential surface of the tapering, the inner circumferential surface of the tapering being substantially parallel to the rotational axis of the hub structure, wherein:
the coil spring is inserted to be interposed in place while being compressed in the direction of the rotational axis of the hub structure;
an axial restoring force of the coil spring urges the tapering, the frictional member and the pulley member into press contact with each other;
the second end of the coil spring contacts the clutch surface; and
the second end of the coil spring is elastically deformed in a radial direction to urge the second end of the coil spring onto the clutch surface due to a radial restoring force of the coil spring and the second end of the coil spring contacts the clutch surface with a press contact engaging force that varies based on a relation between an inputted rotational torque and a first frictional torque, and wherein the first frictional torque is generated between the second end of the coil spring and the clutch surface.

2. The pulley structure as set forth in claim 1, wherein the frictional member is fixed to the pulley member so that the frictional member is allowed to slip relative to the tapering only.

3. The pulley structure as set forth in claim 1, wherein the pulley structure is so configured that
the coil spring is urged to expand in diameter and causes a slip at a contact point between the coil spring and the clutch surface when the inputted rotational torque is larger than the first frictional torque that is generated between the second end of the coil spring and the clutch surface.

4. The pulley structure as set forth in claim 1, wherein the pulley structure is so configured that:
   the conical round surface of the tapering and the frictional member generate a second frictional torque therebetween;
   the second end of the coil spring and the clutch surface generate the first frictional torque therebetween; and
   the first frictional torque and the second frictional torque have different values.

5. The pulley structure as set forth in claim 1, wherein the coil spring is contracted in diameter.

6. The pulley structure as set forth in claim 1, wherein when the inputted rotational torque is less than the first frictional torque that is generated between the second end of the coil spring and the clutch surface, the coil spring is urged to contract in diameter and the press contact engaging force between the second end of the coil spring and the clutch surface is increased; and
   when the inputted rotational torque is larger than the first frictional torque that is generated between the second end of the coil spring and the clutch surface, the coil spring is urged to expand in diameter and the press contact engaging force between the second end of the coil spring and the clutch surface is weakened.

\* \* \* \* \*